No. 661,834. Patented Nov. 13, 1900.
G. M. WILLIAMS.
TRUCK.
(Application filed Mar. 7, 1900.)
(No Model.)
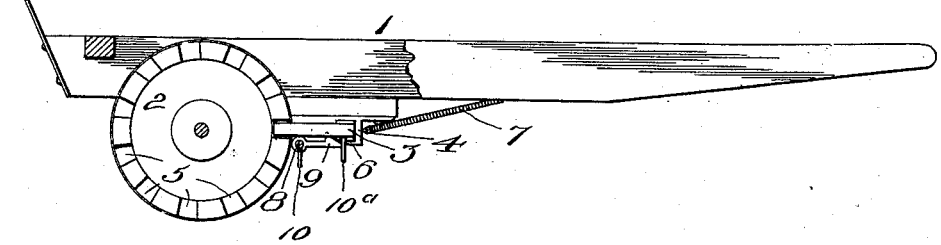
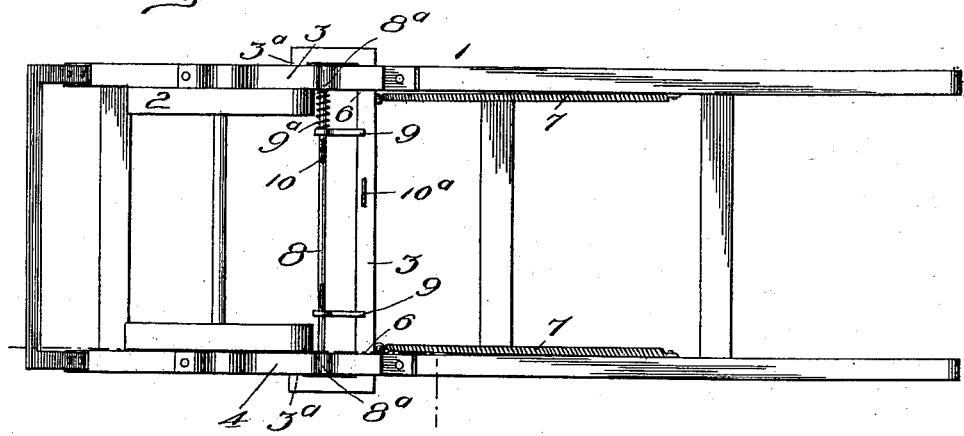
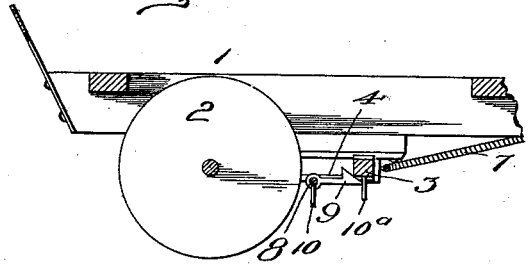
Witnesses
Edwin B. N. Tower, Jr.
Margaretta Jackson
Inventor:
George M. Williams
By: Edson Bros,
Attorneys
THE NORRIS PETERS CO., PHOTO-LITHO., WASHINGTON, D. C.

UNITED STATES PATENT OFFICE.

GEORGE M. WILLIAMS, OF SANTA ROSA, CALIFORNIA.

TRUCK.

SPECIFICATION forming part of Letters Patent No. 661,834, dated November 13, 1900.

Application filed March 7, 1900. Serial No. 7,671. (No model.)

*To all whom it may concern:*

Be it known that I, GEORGE M. WILLIAMS, a citizen of the United States, residing at Santa Rosa, in the county of Sonoma and State of California, have invented certain new and useful Improvements in Trucks; and I do hereby declare the following to be a full, clear, and exact description of the invention, such as will enable others skilled in the art to which it appertains to make and use the same.

My invention relates to certain improvements in trucks, more especially that class adapted for use in stores, warehouses, and like business places in readily moving or transporting barrels, boxes, &c.

It has for its object principally to provide for the ready and convenient locking and unlocking of the truck-wheels as against turning or axial movement, as occasion may require, to provide for the ready manipulation or actuation of the lock, and to otherwise promote efficiency, facility, and utility.

It consists of the combination, with the wheels of the truck, each provided with a circular series of sockets or notches in its outer side, of a sliding or locking bar having inturned ends adapted to engage or enter said sockets or notches, said sliding or locking bar passing or arranged yoke-like over said wheels with said ends opposed to the outer sides of said wheels, and of the details of the construction and arrangement of the parts, all substantially as hereinafter more fully disclosed, and specifically pointed out by the claims.

In the accompanying drawings, illustrating the preferred embodiment of my invention, Figure 1 is a broken longitudinal section taken through the truck between a handled or side bar and a wheel. Fig. 2 is a rear or underneath view thereof. Fig. 3 is a broken longitudinal section taken intermediately of the wheels.

It will be understood that I do not limit myself to details, as they may be changed without departing from the spirit of my invention and the same yet remain intact and be protected.

In carrying out my invention I employ a truck 1, of the character above described, in its general construction such as ordinarily used, with its wheels 2, however, arranged upon their axle or shaft within the truck-frame or opposite the inner side of the handled or side bars thereof. In connection with said truck I use a brake or lock for the relative locking and unlocking of said wheels, comprising a transverse sliding or locking bar 3, adapted to engage said wheels, specially designed to that end, as presently disclosed. The locking or sliding bar 1 is arranged or supported in position within opposite skeleton castings or brackets 4, suitably secured to the handled or side bars of the truck-frame upon the under side. Said sliding or locking bar 3 is preferably yoke-like in construction to cause it to stand above the wheels 2, it having inturned end portions $3^a$ reaching down and opposed to the outer sides of the wheels 2. These end portions $3^a$ are preferably in the form of right-angled lateral or end extensions of said bar, and the wheels 2 are provided each with a circular series of notches or sockets 5 upon the outer sides to receive or permit of the engagement therewith of the inturned free ends of said bar. These are prevented from jamming against the wheels by shoulders 6, formed upon the bar itself, adapted to abut the brackets or castings 4 where the bar passes therethrough. Said notches or sockets have their outer ends closed by the rims of the wheels to prevent the entrance of dirt, &c., thereto. This bar or brake is adapted to be held automatically in engagement with the notches or sockets 5 of the truck-wheels when it is desired to prevent the latter from turning on the axle by means of springs 7, coiled or helical, secured or connected to the truck-frame and said bar, respectively. A cylindric bar or rod 8, carrying catches 9 at a suitable interval apart, has its ends let into sockets or eyes $8^a$ on the castings or brackets 4 to turn therein, and connected to said rod near one end and the truck-frame is a preferably coiled spring $9^a$, the function of which will appear presently. The rod or bar 8 has a trip or projection 10 near its opposite end to provide for its convenient actuation by the foot or otherwise in axially moving said rod to disengage its catches from the locking-bar when the latter is to be released for engagement with the wheel notches or sockets.

It will be seen that when the locking-bar 3 is withdrawn or disengaged from the radial or lateral notches 5 of the truck-wheels, effected by pressing down upon said bar, preferably by the foot, sufficiently to overcome the action or resistance of its springs, it (said bar) will be caused to pass the backs of said catches and below and be caught and be held by said catches, thus holding said bar disengaged from said wheels. During such passage of said bar said catches yield and instantly or automatically resume their former or normal position to effect the retention of the locking-bar as against the action of its springs. Of course in order to again effect engagement of the locking-bar with the truck-wheels it is only required that sufficient pressure be applied by the foot or otherwise to the catch-carrying rod through the trip or lug 10 thereof, said rod turning on its axes and permitting the catches to be disengaged from said bar. This disengagement of said catches from said sliding bar will allow said bar to be automatically moved or slid into engagement with the notches or sockets of the truck-wheels under the action of its springs, as above intimated.

The locking of the truck-wheels, as is desirable when loading upon the truck whatever weight or heavy body it may be required to move or transport thereon, aids to prevent the involuntary moving or slipping of the truck, though it may be braced by the foot or body of the person using it, as well understood.

It will be appreciated that any desired part of one truck may be used in the make up of any other truck, if preferred.

Having thus fully described my invention, what I claim, and desire to secure by Letters Patent, is—

1. A truck of the character described, having its wheels arranged within its frame, said wheels provided, each, with a series of lateral notches or sockets on the outer side and a sliding locking-bar adapted to laterally engage said notches, substantially as specified.

2. A truck of the character described, having a locking-bar provided with inturned ends adapted to engage laterally the truck-wheels, substantially as set forth.

3. A truck of the character described, having its wheels arranged within its frame and a sliding locking-bar having right-angled end portions or extensions adapted to laterally engage said wheels, substantially as set forth.

4. A truck of the character described, having its wheels provided with lateral sockets or notches, upon the outer sides, and a sliding locking-bar having right-angled end portions or extensions adapted to engage said notches or sockets, substantially as set forth.

5. A truck of the character described, having its wheels arranged within its frame, said wheels provided each with a series of notches or sockets upon the outer side, and a sliding locking-bar having right-angled end portions or extensions with their inturned extremities adapted to engage said notches or sockets, substantially as specified.

6. In a truck of the character described, the combination of the sliding locking-bar having inturned end portions adapted to engage laterally the truck-wheels, and a catch-carrying rod or bar with its catches adapted to engage said locking-bar, substantially as set forth.

7. In a truck of the character described, the combination of the truck-wheels having lateral notches or sockets, upon the outer side, a spring-actuated locking-bar having right-angled end portions to engage said notches or sockets and a spring-actuated catch-carrying bar or rod having its catches adapted to engage said locking-bar, substantially as set forth.

8. In a truck of the character described, the combination of the wheels arranged within the truck-frame and having each a series of lateral notches or sockets, upon the outer side, a spring-actuated locking-bar adapted to engage said notches or sockets, brackets or supports for said locking-bar, secured or arranged upon the truck-frame and a spring-actuated rod or bar carrying catches adapted to engage said locking-bar, said rod being axially hung upon said brackets, substantially as specified.

In testimony whereof I affix my signature in presence of two witnesses.

GEORGE M. WILLIAMS.

Witnesses:
M. J. HAHMANN,
C. T. HAHMANN.